Nov. 20, 1923
C. I. BAILEY
SHOCK ABSORBER
Filed Aug. 26, 1921
1,474,810
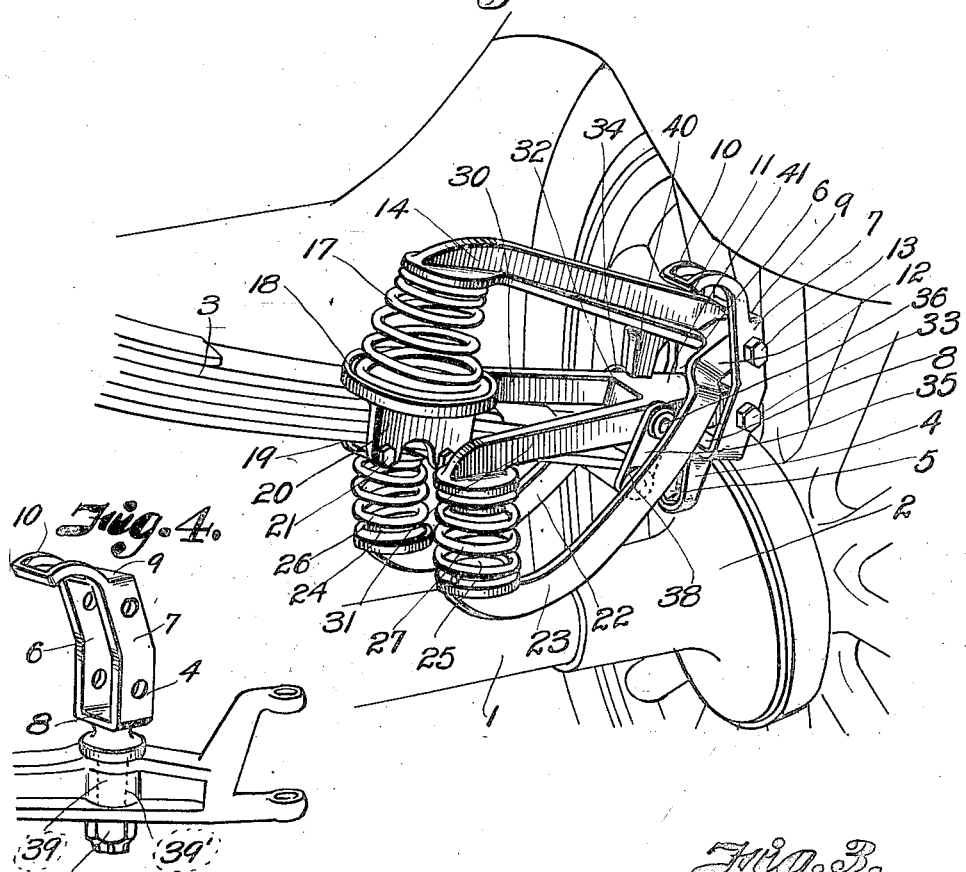
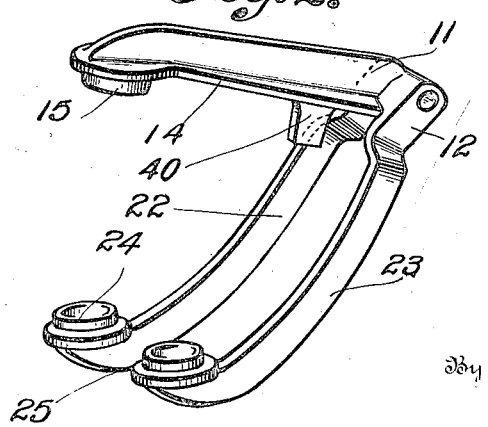
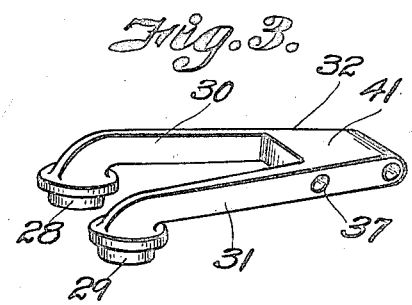
Inventor
Chester I. Bailey
By
Attorney Patented Nov. 20, 1923.

1,474,810

UNITED STATES PATENT OFFICE.

CHESTER I. BAILEY, OF GREENWOOD, MISSOURI, ASSIGNOR TO LOUIE H. OBERREICH, OF INDIANAPOLIS, INDIANA.

SHOCK ABSORBER.

Application filed August 26, 1921. Serial No. 495,580.

*To all whom it may concern:*

Be it known that I, CHESTER I. BAILEY, a citizen of the United States, residing at Greenwood, in the county of Jackson and State of Missouri, have invented certain new and useful Improvements in Shock Absorbers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to shock absorbers for motor vehicles and it is particularly designed to be used on the type of motor vehicles now built by the Ford Motor Company of Detroit, Michigan.

The invention will be described in connection with the Ford motor vehicle although it is not necessarily limited to that particular type of car. The primary object of the invention is to provide means whereby an efficient, inexpensive and durable shock absorber may be provided and in the present embodiment of the invention it is particularly designed to be attached to a Ford automobile without necessity of reconstructing any of the parts.

In the drawings,

Fig. 1 is a perspective view of a shock absorber constructed in accordance with my invention and designed for the rear axle of the motor vehicle.

Fig. 2 is a detail perspective view of the spring perch.

Fig. 3 is a detail perspective view of a compensating lever co-operating with the spring perch, and Fig. 4 is a detail perspective view of a slightly modified form of perch bracket designed to be applied to the front axle.

Referring now to the drawings by numerals of reference:

1 designates the rear axle, 2 the brake housing therefor, and 3 the rear spring. The brake housing is shown as having the standard spring perch removed and in place thereof is substituted a spring perch bracket 4, fastened in the normal spring perch bolt opening by the bolt 5. The bracket consists of a loop comprising two side bars 6 and 7, connected at their lower ends by a cross bar 8 and at the top by a corresponding bar 9, there being an inwardly curved stop 10 at the top of the bracket. Pivoted near the upper portion of the bracket is a spring perch 11 consisting of an angle portion 12, fastened to the bars 6 and 7 by the pivot bolt 13. From the portion 12 extends a substantially horizontal outstanding arm 14, having a spring-engaging boss 15 to engage a coil spring 17 interposed between it and the spring seat 18, carried by the end of the spring 3 and having downwardly projecting side bars 19 and 20, which embrace the side of the spring 3 and which is secured in the form of a clevis by the bolts 21.

The spring perch carries two parallel downwardly and inwardly curved arms 22 and 23, provided with spring-engaging bosses 24 and 25, which form seats for the coil springs 26 and 27, the upper ends of which are engaged by the bosses 28 and 29 on the arms 30 and 31 of the compensating lever 32, pivoted to the bars 6 and 7 by the bolt 33.

The end of the spring 3 is shackled to the compensating lever 32 by the shackle bars 34 and 35, the shackle bars being secured to the compensating lever by a bolt 36, which passes through an opening 37 in the lever, and the lower ends are fastened to the end of the spring by a bolt 38.

It will be observed that the arms 30 and 31 straddle the spring 3 and that their bosses 28 and 29 are in line with the bosses 24 and 25 so as to hold the springs 26 and 27 in proper relation. Therefore, when power is applied to the vehicle and it is transmitted in a downward direction to the spring 3, there will be a pull of the shackle, pulling down the lever 32 to compress the springs 26 and 27, thus putting the springs in compression, the downward pull also causing a downward movement of the arm 14 so as to put the spring 17 in compression.

On a rebound, the spring 27 will absorb the shocks so that the spring will be floated between the springs 17, 26 and 27, thereby enabling the springs to take up the vibrations of the car passing over the road bed and preventing sudden jars and shocks.

In Fig. 4 I have shown a slightly modified form of bracket having a spindle or shank 39 which fits in the spring perch opening 39' and is secured thereto by a nut 39''. The bracket in other respects resembles the bracket 4 and it receives the shock absorber in substantially the same manner as shown in Fig. 1, the difference being in the location of the bracket.

The arm 14 of the spring perch is provided with a lug or projection 40, which constitutes a stop to limit the upward rebounding movement of the lever 32, the stop lug 40 being in line with the broad flat face 41 of the lever so that on excessive rebound, the lever can only travel in an upward direction a limited distance and if an excessive rebound occurs, the upward movement of the arm 14 will be limited by the curved stop 10.

It will be seen from the foregoing that a shock absorber constructed in accordance with my invention may be readily attached to certain types of motor vehicles in the most convenient manner and that it is adapted to absorb the shocks and jars to which the vehicle is subjected in traveling over the road bed.

What I claim and desire to secure by Letters-Patent is:

1. In combination, an axle and a body spring, a spring perch bracket carried by the axle, a spring perch pivoted to the bracket and having a laterally projecting arm and two downwardly curved arms, a compensating lever between the arms and fastened to the bracket, a shackle connecting the end of the body spring to the compensating lever, a spring seat on the body spring, a coil spring interposed between the spring seat and the first named arm of the spring perch, and springs between the ends of the downwardly curved arms of the spring perch and the compensating lever.

2. In combination, an axle and a body spring, a spring perch bracket carried by the axle, a spring perch pivoted to the bracket and having a laterally projecting arm and two downwardly curved arms, a compensating lever between the arms and fastened to the bracket, a shackle connecting the end of the body spring to the compensating lever, a spring seat on the body spring, a coil spring interposed between the spring seat and the first named arm of the spring perch, springs between the ends of the downwardly curved arms of the spring perch and the compensating lever, and a stop carried by the spring perch bracket to limit the upward movement of the first mentioned arm of the spring perch.

3. In combination, an axle and a body spring, a spring perch bracket carried by the axle, a spring perch pivoted to the bracket and having a laterally projecting arm and two downwardly curved arms, a compensating lever between the arms and fastened to the bracket, a shackle connecting the end of the body spring to the compensating lever, a spring seat on the body spring, a coil spring interposed between the spring seat and the first named arm of the spring perch, springs between the ends of the downwardly curved arms of the spring perch and the compensating lever, and a stop carried by the first named arm of the spring perch and in line with the compensating lever to limit its upward movement with respect to the first named arm of the spring perch.

4. A shock absorber comprising a bracket, a spring perch pivoted in the bracket and having an outwardly projecting arm and two downwardly curved arms, all of the arms being integral, and a compensating lever pivoted to the bracket and having lateral arms, the lateral arms being in line with the downwardly curved arms of the spring perch.

5. A shock absorber comprising a bracket, a spring perch pivoted in the bracket and having an outwardly projecting arm and two downwardly curved arms, all of the arms being integral, a compensating lever pivoted to the bracket and having lateral arms, the lateral arms being in line with the downwardly curved arms of the spring perch, coil springs between the respective arms of the compensating lever and the downwardly curved arms of the spring perch, a body-spring-supported spring seat, and a spring between the spring seat and the end of the lateral arm of the spring perch.

6. A shock absorber comprising a bracket having two complementary members pivoted thereto, one of which has downwardly curved arms for supporting springs and an upper lateral arm for exerting spring compression in a downward direction, a spring seat adapted to align therewith, the other member having arms provided with terminals in line with the terminals of the downwardly projecting arms of the first member to oppose spring pressure exerted by the downwardly projecting arms of the first member.

7. In combination, an automobile axle, a main automobile spring, a bracket on said axle, an arm pivotally mounted on said bracket and extending above said main automobile spring, a second arm rigid with said first arm and extending below said main automobile spring, a compensating lever pivotally mounted on said bracket and connected with said main automobile spring, a spring acting between said main automobile spring and one of said arms, and a second spring acting between said compensating lever and the other of said arms.

8. In combination, an automobile axle, a main automobile spring, a bracket on said axle, an arm pivotally mounted on said bracket and extending above said main automobile spring, a stop on said bracket to limit the upward movement of said arm, a second arm rigid with said first arm and extending below said main automobile spring, a compensating lever pivotally mounted on said bracket and connected with said main automobile spring, a spring acting between said main automobile spring and one of said arms, and a second spring acting between said compensating lever and the other of said arms.

9. In combination an automobile axle, a main automobile spring, a bracket on said axle, an arm pivotally mounted on said bracket and extending above said main automobile spring, a second arm rigid with said first arm and extending below said main automobile spring, a compensating lever pivotally mounted on said bracket and connected with said main automobile spring, a stop acting between said first arm and said compensating lever, a spring acting between said main automobile spring and one of said arms, and a second spring acting between said compensating lever and the other of said arms.

10. In combination, an automobile axle, a main automobile spring, a bracket on said axle, an arm pivotally mounted on said bracket and extending above said main automobile spring, a stop on said bracket to limit the upward movement of said arm, a second arm rigid with said first arm and extending below said main automobile spring, a compensating lever pivotally mounted on said bracket and connected with said main automobile spring, a stop acting between said first arm and said compensating lever, a spring acting between said main automobile spring and one of said arms, and a second spring acting between said compensating lever and the other of said arms.

11. An axle, a main spring, and a supporting bracket carried by said axle, in combination with two levers pivotally mounted on said support on separated pivots and connected to the main spring at separated points thereon, and one or more springs acting between said two levers.

12. An axle, a main spring, and a supporting bracket carried by said axle, in combination with two levers pivotally mounted on said support on separated pivots and connected to the main spring at separated points thereon, and one or more springs acting between said two levers, the connection of one of said levers to the main spring being through a spring, and that of the other being through a link.

13. An axle, a main spring, and a supporting bracket carried by said axle, in combination with two levers pivotally mounted on said support on separated pivots and connected to the main spring at separated points thereon, and one or more springs acting between said two levers, the connection of one of said levers to the main spring being through a spring.

In testimony whereof I affix my signature.

CHESTER I. BAILEY.